(12) United States Patent
Varnhagen et al.

(10) Patent No.: US 12,443,191 B2
(45) Date of Patent: *Oct. 14, 2025

(54) METHODS AND SYSTEMS FOR PERFORMING INTER-TRAJECTORY RE-LINEARIZATION ABOUT AN EVOLVING REFERENCE PATH FOR AN AUTONOMOUS VEHICLE

(71) Applicant: FORD GLOBAL TECHNOLOGIES, LLC, Dearborn, MI (US)

(72) Inventors: Scott Julian Varnhagen, Ann Arbor, MI (US); Alice Kassar, Detroit, MI (US); Ghassan Atmeh, Grosse Pointe Woods, MI (US); Neal Seegmiller, Pittsburgh, PA (US); Ramadev Burigsay Hukkeri, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

This patent is subject to a terminal disclaimer.

(21) Appl. No.: 18/051,982

(22) Filed: Nov. 2, 2022

(65) Prior Publication Data
US 2023/0288935 A1  Sep. 14, 2023

Related U.S. Application Data

(63) Continuation of application No. 16/901,322, filed on Jun. 15, 2020, now Pat. No. 11,520,343.

(51) Int. Cl.
*G05D 1/00* (2024.01)
*B60W 30/09* (2012.01)
(Continued)

(52) U.S. Cl.
CPC .......... *G05D 1/0214* (2013.01); *B60W 30/09* (2013.01); *B60W 30/18163* (2013.01);
(Continued)

(58) Field of Classification Search
None
See application file for complete search history.

(56) References Cited

U.S. PATENT DOCUMENTS 10,671,075 B1 * 6/2020 Kobilarov ............ G05D 1/0088
10,831,210 B1 * 11/2020 Kobilarov ......... B60W 60/0013
(Continued)

FOREIGN PATENT DOCUMENTS

CN 108725446 A 11/2018
CN 109375632 A 2/2019
(Continued)

OTHER PUBLICATIONS

Machine translation of DE-102018213971-A1 (Year: 2020).*
(Continued)

*Primary Examiner* — Kenneth M Dunne
(74) *Attorney, Agent, or Firm* — Frank A. MacKenzie; Brooks Kushman, P.C.

(57) ABSTRACT

Disclosed herein are systems, methods, and computer program products for generating a reference path for an autonomous vehicle. The methods comprising: receiving, by a computing device, a reference trajectory for the autonomous vehicle; generating, by the computing device, a first alternative trajectory for the autonomous vehicle based on an objective identified by the reference trajectory; comparing, by the computing device, the first alternative trajectory to the reference trajectory or a previously generated alternative trajectory; selecting, by the computing device, whether to generate a second alternative trajectory based on a result of said comparing; and generating, by the computing device, the second alternative trajectory for the autonomous vehicle in response to said selecting.

16 Claims, 14 Drawing Sheets

(51) Int. Cl.
*B60W 30/18* (2012.01)
*B60W 60/00* (2020.01)

(52) U.S. Cl.
CPC ....... *B60W 60/0015* (2020.02); *G05D 1/0088* (2013.01); *B60W 2520/06* (2013.01); *B60W 2552/53* (2020.02); *B60W 2554/4041* (2020.02); *B60W 2554/4042* (2020.02); *B60W 2554/4043* (2020.02); *B60W 2554/801* (2020.02); *B60W 2554/802* (2020.02); *B60W 2555/60* (2020.02)

(56) References Cited

U.S. PATENT DOCUMENTS

| | | | | |
|---|---|---|---|---|
| 11,520,343 | B2 * | 12/2022 | Varnhagen | G05D 1/0214 |
| 2018/0307236 | A1 * | 10/2018 | Reed | B60W 10/18 |
| 2019/0235516 | A1 * | 8/2019 | Zhang | B60W 60/001 |
| 2019/0258251 | A1 | 8/2019 | Ditty et al. | |
| 2019/0278284 | A1 * | 9/2019 | Zhang | G05D 1/0223 |
| 2020/0117207 | A1 | 4/2020 | Zhang | |
| 2020/0159216 | A1 | 5/2020 | Le et al. | |
| 2021/0020045 | A1 * | 1/2021 | Huang | G05D 1/692 |
| 2021/0197798 | A1 | 7/2021 | Funke et al. | |
| 2021/0197819 | A1 * | 7/2021 | Okamoto | B60W 30/06 |

FOREIGN PATENT DOCUMENTS

| | | |
|---|---|---|
| CN | 110126837 A | 8/2019 |
| CN | 110214296 A | 9/2019 |
| CN | 111273655 A | 6/2020 |
| CN | 112955358 A | 6/2021 |
| DE | 102018213971 A1 * | 2/2020 |

OTHER PUBLICATIONS

Notification of First Office Action in corresponding Chinese patent application No. 2021800425724, dated Apr. 24, 2023 with English Translation, 11 pages.

Part 1 of 2, Chebly A., "Trajectory planning and tracking for autonomous vehicles navigation", Automatic Control Engineering, Universite de Technologie de Compiegne, submitted Mar. 9, 2018 (pp. 1-101).

Part 2 of 2, Chebly A., "Trajectory planning and tracking for autonomous vehicles navigation", Automatic Control Engineering, Universite de Technologie de Compiegne, submitted Mar. 9, 2018 (pp. 102-201).

Written Opinion issued Dec. 7, 2021 for International Application No. PCT/US2021/037165.

* cited by examiner

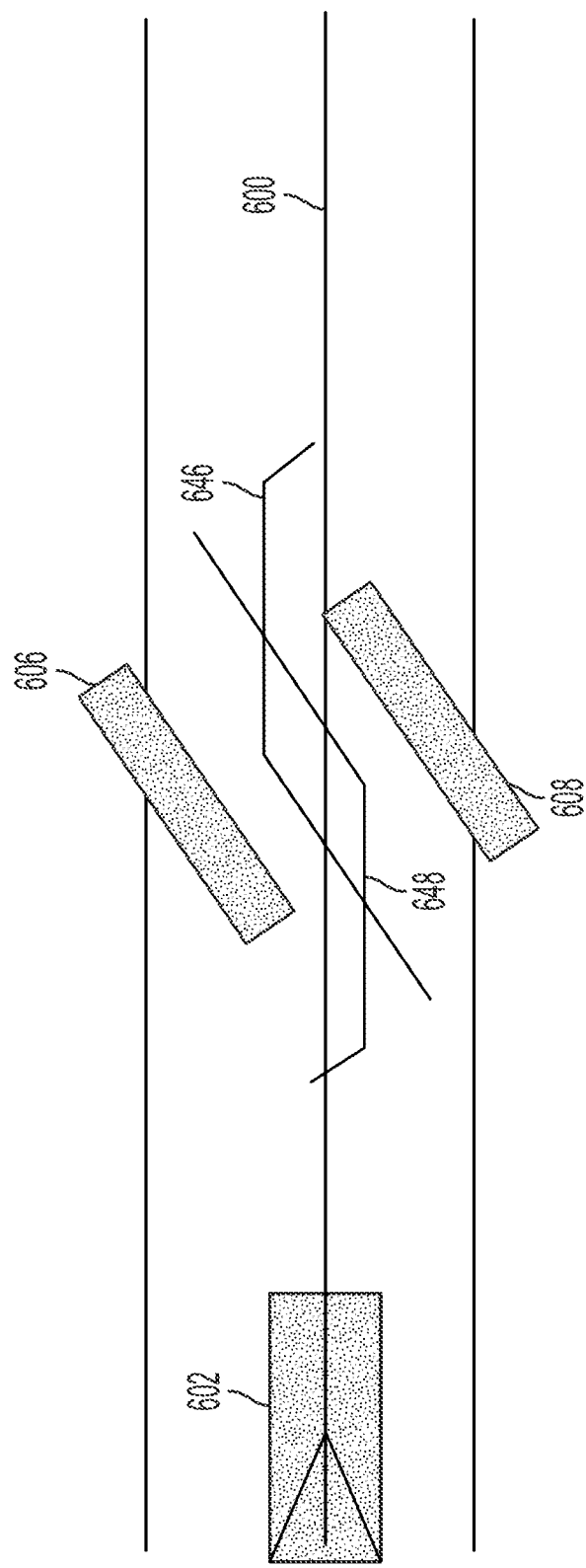

METHODS AND SYSTEMS FOR PERFORMING INTER-TRAJECTORY RE-LINEARIZATION ABOUT AN EVOLVING REFERENCE PATH FOR AN AUTONOMOUS VEHICLE

CROSS-REFERENCE TO RELATED APPLICATIONS

The present application is a continuation application of and claims priority to U.S. patent application Ser. No. 16/901,322 which was filed on Jun. 15, 2020, now U.S. Pat. No. 11,520,343 issued Dec. 6, 2022. The entire content of this application is incorporated herein by reference.

BACKGROUND

Traditional autonomous vehicle path planning systems plan using high dimension Cartesian coordinate frames. However, it is often advantageous to decompose planning activities into lower dimension curvilinear coordinate frames. Doing so allows the decoupling of the lateral components (e.g., steering) from the longitudinal (e.g., speed) components, making it possible to linearize vehicle dynamics and construct a convex formulation for optimizing path planning.

This document describes methods and systems that are directed to addressing the problems described above, and/or other issues.

SUMMARY

The present disclosure concerns implementing systems and methods for generating a reference path for an autonomous vehicle. The methods comprise: receiving a reference trajectory for the autonomous vehicle; generating a first alternative trajectory for the autonomous vehicle based on an objective identified by the reference trajectory; comparing the first alternative trajectory to the reference trajectory or a previously generated alternative trajectory; selecting whether to generate a second alternative trajectory based on a result of said comparing; and generating the second alternative trajectory for the autonomous vehicle in response to said selecting.

The implementing systems can comprise: a processor; and a non-transitory computer-readable storage medium comprising programming instructions that are configured to cause the processor to implement a method for operating an automated system. The above-described methods can also be implemented by a computer program product comprising memory and programming instructions that are configured to cause a processor to perform operations.

BRIEF DESCRIPTION OF THE DRAWINGS

FIG. 6D illustrates example bounds on a lateral offset.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

Figure 1:
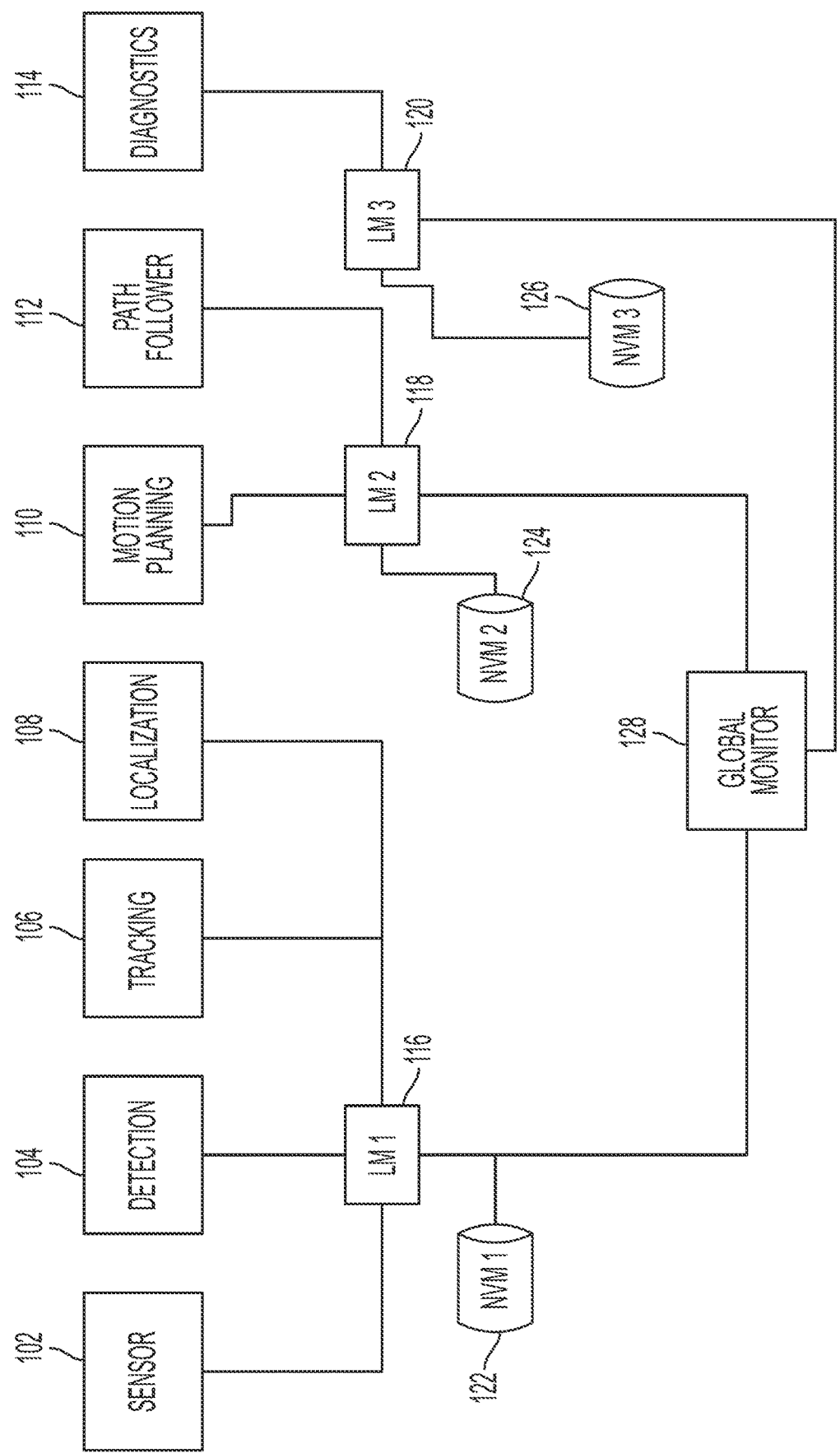
FIG. 1 illustrates example components of a robotic device monitoring system.

FIG. 1 illustrates an example monitoring system for a robotic system according to an embodiment. As illustrated by FIG. 1, a monitoring system may include one or more subsystems that are responsible for performing one or more types of tasks or functions. For example, FIG. 1 illustrates a monitoring system 100 with a sensor subsystem 102, a detection subsystem 104, a tracking subsystem 106, a localization subsystem 108, a motion planning subsystem 110, a path follower subsystem 112 and a diagnostics subsystem 114.

As illustrated in FIG. 1, the subsystems may be in communication with a local monitor 116, 118, 120. A local monitor 116, 118, 120 may be implemented using hardware, software or a combination of hardware. For instance, a local monitor 116, 118, 120 may be implemented as part of a microcontroller. A local monitor 116, 118, 120 may include one or more of a register or data store for temporarily storing data, a comparator for comparing data, programmed circuitry for performing one or more cryptographic operations and/or the like. A local monitor 116, 118, 120 may receive data pertaining to one or more functions executed by a subsystem, and may use this information to verify at least a portion of the execution flow to which the function(s) pertain as explained in more detail below.

FIG. 1 also illustrates example non-volatile memory (NVM) 122, 124, 126, which may be used to store information, as discussed in more detail throughout this disclosure. In various embodiments, an NVM 122, 124, 126 may include a master hash table. A master hash table refers to a data structure that stores encrypted and/or encoded information associated with one or more functions, as discussed in more detail below.

As shown in FIG. 1, a monitoring system 100 may include a global monitor 128. A global monitor 128 may be implemented using hardware, software or a combination of hardware. For instance, a global monitor 128 may be implemented as part of a microcontroller. A global monitor 128 may include one or more of a register or data store for temporarily storing data, a comparator for comparing data, programmed circuitry for performing one or more cryptographic operations and/or the like. A global monitor 128 may be in communication with one or more of the local monitors 116, 118, 120. As explained in more detail below, local monitors 116, 118, 120 may send to a global monitor 128 information pertaining to functions or tasks executed by one or more of their associated subsystems. The global monitor 128 may use this information to monitor, detect or track patterns at a higher system level. In other words, a local monitor 116, 118, 120 may detect faults or anomalies at a local level, while a global monitor 128 may detect system level faults over a period of time. In various embodiments, a global monitor 128 may be in communication with a diagnostics system (not shown).

In various embodiments, a motion planning subsystem 110 may include a longitudinal controller 130 and a lateral controller 132. A longitudinal controller 130 and/or a lateral controller 132 may be implemented using hardware, software or a combination of hardware. For instance, a longitudinal controller 130 and/or a lateral controller 132 may be implemented as part of a microcontroller. A longitudinal controller 130 may regulate an autonomous vehicle's velocity. A lateral controller 132 may control steering of an autonomous vehicle's wheels for path tracking.

It is understood that additional or alternate subsystems, along with additional or fewer local monitors, NVMs and/or configurations of each may be used within the scope of this disclosure.

Figure 2:
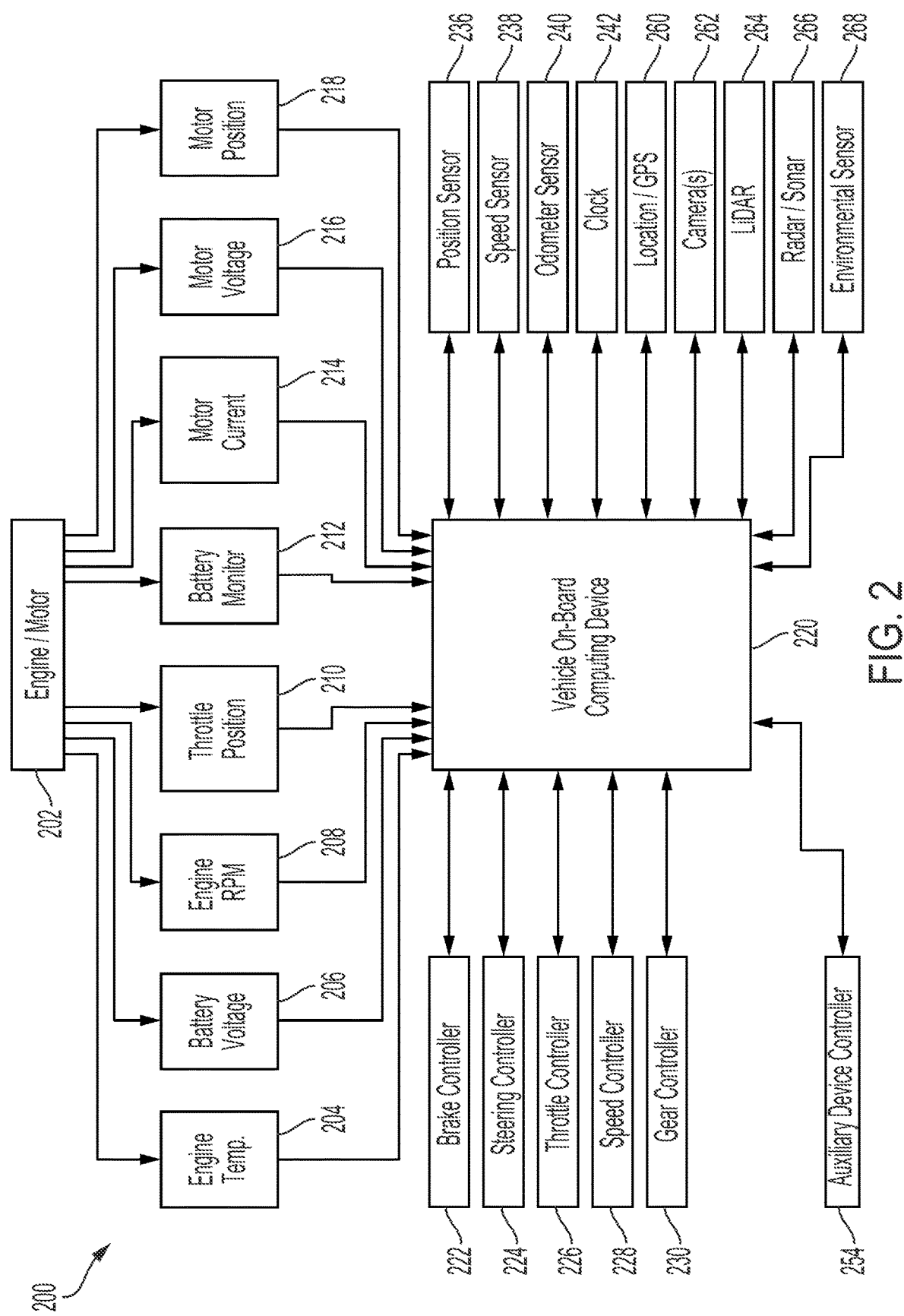
FIG. 2 illustrates example systems and components of an autonomous vehicle.

FIG. 2 illustrates an example system architecture 200 for a vehicle, such as an AV. AV 102 of FIG. 1 can have the same or similar system architecture as that shown in FIG. 2. Thus, the following discussion of system architecture 200 is sufficient for understanding vehicle 102 of FIG. 1.

As shown in FIG. 2, the vehicle includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine rotations per minute (RPM) sensor 208, and a throttle position sensor 210. If the vehicle is an electric or hybrid vehicle, then the vehicle may have an electric motor, and accordingly will have sensors such as a battery monitoring system 212 (to measure current, voltage and/or temperature of the battery), motor current 214 and voltage 216 sensors, and motor position sensors such as resolvers and encoders 218.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 260 (e.g., a global positioning system (GPS) device); object detection sensors such as one or more cameras 262; a LiDAR sensor system 264; and/or a radar and or and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to an on-board computing device 220. The on-board computing device 220 analyzes the data captured by the sensors and optionally controls operations of the vehicle based on results of the analysis. For example, the on-board computing device 220 may control braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as LiDAR 264 is communicated from those sensors to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document When the on-board computing device 220 detects a moving object, the on-board computing device 220 will generate one or more possible object trajectories for the detected object, and analyze the possible object trajectories to assess the risk of a collision between the object and the AV. If the risk exceeds an acceptable threshold, the on-board computing device 220 performs operations to determine whether the collision can be avoided if the AV follows a defined vehicle trajectory and/or implements one or more dynamically generated emergency maneuvers is performed in a pre-defined time period (e.g., N milliseconds). If the collision can be avoided, then the on-board computing device 220 may cause the vehicle 200 to perform a cautious maneuver (e.g., mildly slow down, accelerate, or swerve). In contrast, if the collision cannot be avoided, then the on-board computing device 220 will cause the vehicle 200 to take an emergency maneuver (e.g., brake and/or change direction of travel).

In the various embodiments discussed in this document, the description may state that the vehicle or on-board computing device of the vehicle may implement programming instructions that cause the on-board computing device of the vehicle to make decisions and use the decisions to control operations of one or more vehicle systems. However, the embodiments are not limited to this arrangement, as in various embodiments the analysis, decision making and or operational control may be handled in full or in part by other computing devices that are in electronic communication with the vehicle's on-board computing device. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Figure 3:
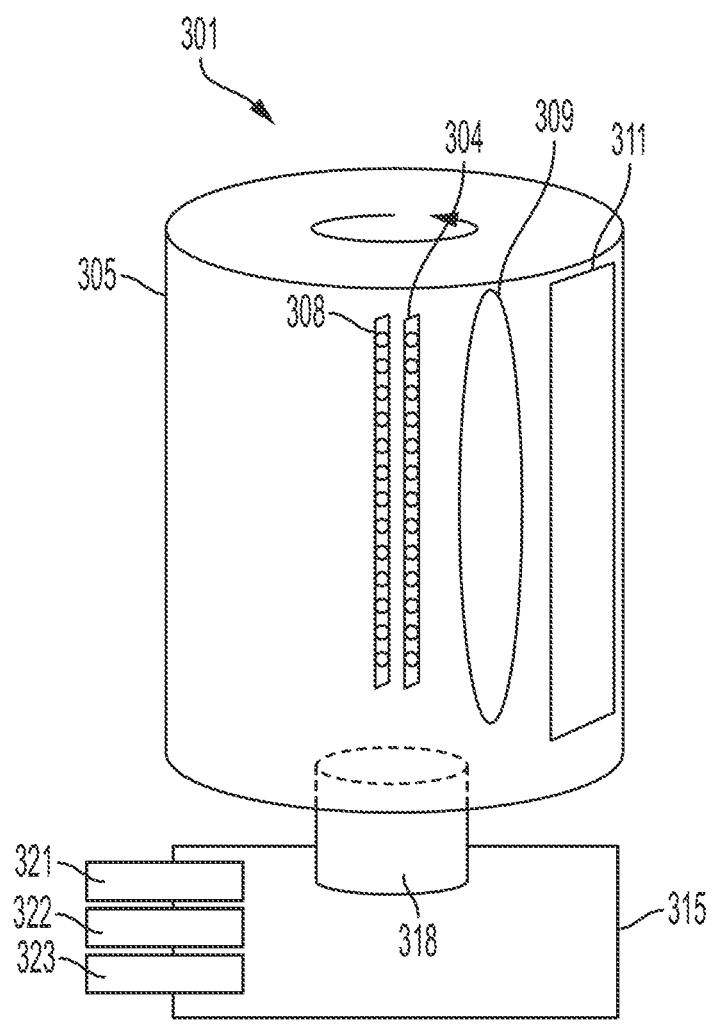
FIG. 3 illustrates example components of a LiDAR system.

FIG. 3 shows an example LiDAR system 301 as may be used in various embodiments. As shown in FIG. 3, the LiDAR system 301 includes a housing 305 which may be rotatable 360° about a central axis such as hub or axle 318. The housing may include an emitter/receiver aperture 311 made of a material transparent to light. Although the example shown in FIG. 3 has a single aperture, in various embodiments, multiple apertures for emitting and/or receiving light may be provided. Either way, the system can emit light through one or more of the aperture(s) 311 and receive reflected light back toward one or more of the aperture(s) 311 as the housing 305 rotates around the internal components. In an alternative embodiment, the outer shell of housing 305 may be a stationary dome, at least partially made of a material that is transparent to light, with rotatable components inside of the housing 305.

Inside the rotating shell or stationary dome is a light emitter system 304 that is configured and positioned to generate and emit pulses of light through the aperture 311 or through the transparent dome of the housing 305 via one or more laser emitter chips or other light emitting devices. The emitter system 304 may include any number of individual emitters, including for example 8 emitters, 64 emitters or 128 emitters. The emitters may emit light of substantially the same intensity, or of varying intensities. The individual beams emitted by 304 will have a well-defined state of polarization that is not the same across the entire array. As an example, some beams may have vertical polarization and other beams may have horizontal polarization. The LiDAR system will also include a light detector 308 containing a photodetector or array of photodetectors positioned and configured to receive light reflected back into the system. The emitter system 304 and detector 308 would rotate with the rotating shell, or they would rotate inside the stationary dome of the housing 305. One or more optical element structures 309 may be positioned in front of the light emitting unit 304 and/or the detector 308 to serve as one or more lenses or waveplates that focus and direct light that is passed through the optical element structure 309.

One or more optical element structures 309 may be positioned in front of the mirror 302 to focus and direct light that is passed through the optical element structure 309. As shown below, the system includes an optical element structure 309 positioned in front of the mirror 303 and connected to the rotating elements of the system so that the optical element structure 309 rotates with the mirror 302. Alternatively or in addition, the optical element structure 309 may include multiple such structures (for example lenses and/or waveplates). Optionally, multiple optical element structures 309 may be arranged in an array on or integral with the shell portion 311.

Optionally, each optical element structure 309 may include a beam splitter that separates light that the system receives from light that the system generates. The beam splitter may include, for example, a quarter-wave or half-wave waveplate to perform the separation and ensure that received light is directed to the receiver unit rather than to the emitter system (which could occur without such a waveplate as the emitted light and received light should exhibit the same or similar polarizations).

The LiDAR system will include a power unit 321 to power the laser emitter unit 304, a motor 303, and electronic components. The LiDAR system will also include an analyzer 315 with elements such as a processor 322 and non-transitory computer-readable memory 323 containing programming instructions that are configured to enable the system to receive data collected by the light detector unit, analyze it to measure characteristics of the light received, and generate information that a connected system can use to make decisions about operating in an environment from which the data was collected. Optionally, the analyzer 315 may be integral with the LiDAR system 301 as shown, or some or all of it may be external to the LiDAR system and communicatively connected to the LiDAR system via a wired or wireless communication network or link.

Figure 4:
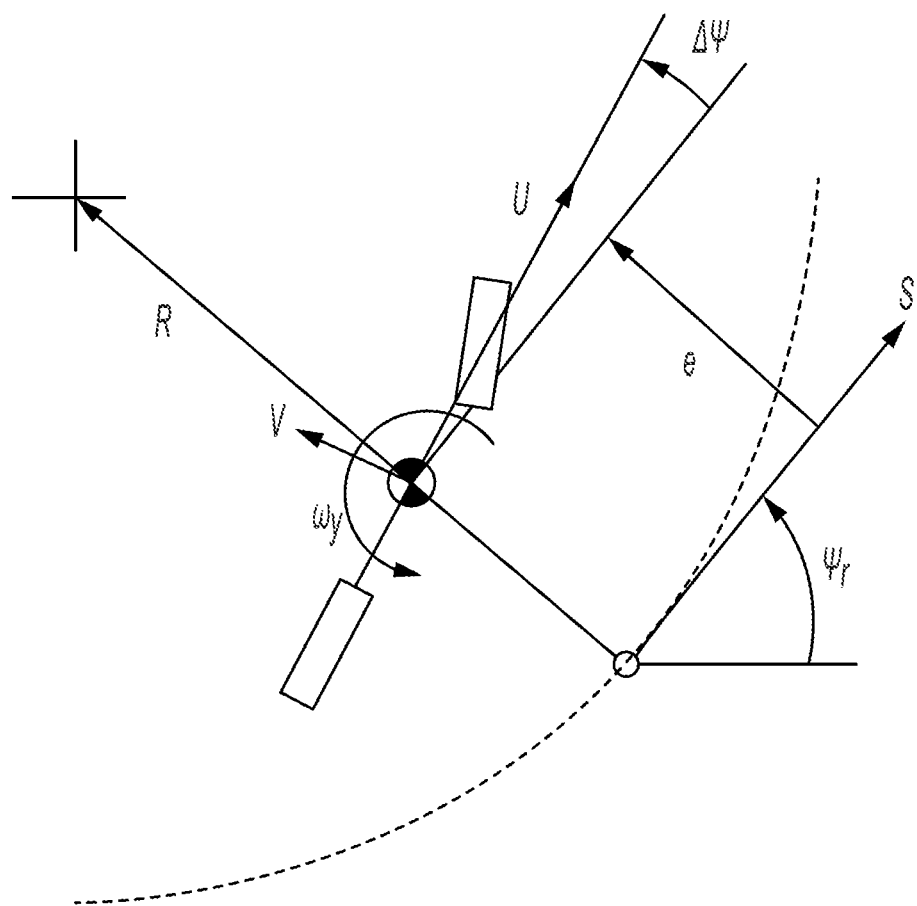
FIG. 4 illustrates an example path of an autonomous vehicle as compared to a reference path.

Instead of performing motion planning for an autonomous vehicle in the high dimensional planar Cartesian space, it is often advantageous to decompose planning activities into a lower dimension curvilinear space. FIG. 4 illustrates an example path of an autonomous vehicle as compared to a reference path according to an embodiment. In FIG. 4, s represents a distance along a reference path, e represents a lateral offset from the reference path, and $\Delta\Psi$ represents a heading offset as compared to a reference path.

Longitudinal planning by an autonomous vehicle can be simplified to a one-dimensional problem of planning speed with respect to time, based on objectives which are at time varying distances along the reference path. These objectives may be selected such that a convex optimization problem can be formulated allowing for efficient and optimal generation of speed profiles. Similarly, lateral planning can be approximated as a two-dimensional problem of planning lateral offset and heading offset with respect to the reference path at predefined distances along the reference path.

Decoupling longitudinal planning from lateral planning relative to a curvilinear reference path may provide the ability to leverage convex optimization techniques to achieve computational speedups. It therefore becomes tractable to optimally refine a trajectory multiple times in series in a given path-planning execution cycle.

Figure 5:
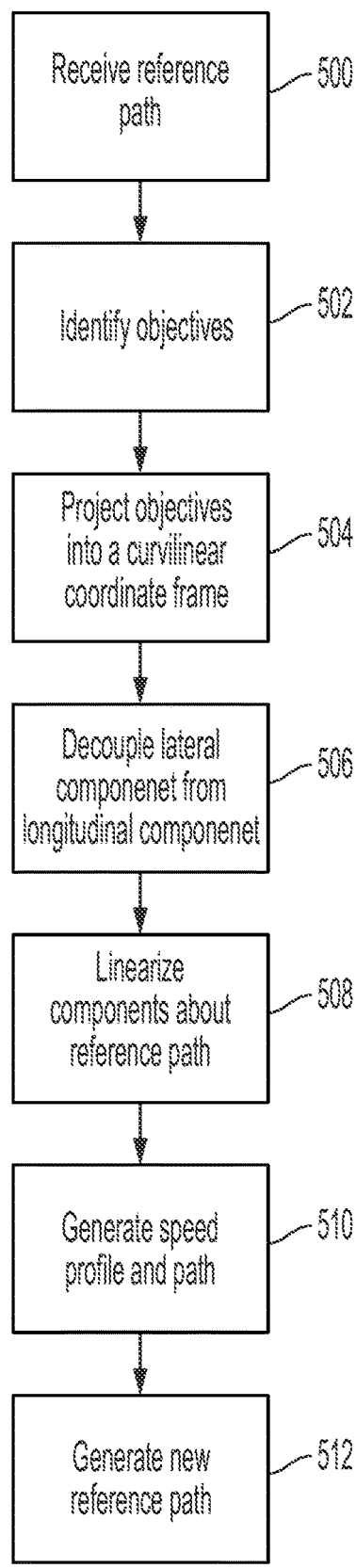
FIG. 5 illustrates an example method of performing inter-trajectory linearization about a reference path.

FIG. 5 illustrates an example method of performing inter-trajectory linearization about a reference path according to an embodiment. As illustrated by FIG. 5, a motion planning system may receive 500 a reference path for an autonomous vehicle. A reference path may be received from a planning system or other system. The received reference path may be described in reference to Cartesian coordinates. The received reference path may serve as an initial coordinate frame, and may not be a feasible path for an autonomous vehicle to execute in the real world. For example, the received reference path may include one or more portions where it would be impossible or infeasible for an autonomous vehicle to navigate such as, for example, through a building or other permanent structure.

A received reference path may define one or more applicable objectives. An objective refers to a criterion that factors into path planning decision making for an autonomous vehicle. Example objectives may include, without limitation, traffic rules, travel within defined road boundaries, collision avoidance, comfortable passing or overtaking, maintaining safe distances, and/or the like.

In various embodiments, an objective may have a lateral component and/or a longitudinal component. As described above, a lateral component may refer to one or more instructions, metrics, measurements and/or the like pertaining to steering of an autonomous vehicle to achieve an objective. A longitudinal component may refer to one or more instructions, metrics, measurements and/or the like pertaining to velocity or speed of an autonomous vehicle to achieve an objective. For instance, if an objective is to overtake another vehicle, it may have a lateral component (e.g., maneuvering into a left lane to pass the vehicle), and a longitudinal component (e.g., increasing speed to pass the vehicle). Additional and/or alternate objectives and/or components may be used within the scope of this disclosure.

As illustrated by FIG. 5, the system may identify 502 one or more objectives from the received reference path. The system may project 504 one or more of the identified objectives into a curvilinear coordinate frame described by the received reference path. In various embodiments, for one or more of the identified objectives, the system may determine which vertices along the reference path are affected. For each affected vertex, the system may determine where the autonomous vehicle should be laterally and/or what speed the autonomous vehicle should have to satisfy the objective. For example, if an objective is passing on the left of a static object, the system may convert this objective into the curvilinear coordinate frame as a constraint indicating where the autonomous vehicle should be laterally and/or what speed the autonomous vehicle should have for each of the affected vertices along the reference path in order to satisfy the objective of passing on the left side of the static object. Similarly, if an objective is stopping before a static object, the system may convert this objective into the curvilinear coordinate frame as a constraint indicating where the autonomous vehicle should be laterally and/or what speed the autonomous vehicle should have for each of the affected vertices along the reference path in order to satisfy the objective of stopping before the static object.

For one or more of the objectives, the system may decouple 506 the lateral component of the objective from the longitudinal component of the objective. In various embodiments, a speed profile may define one or more longitudinal positions in time. The lateral problem may be determined based on the longitudinal positions with respect to time. The solution from solving this decoupled planning problem may be used to inform one or more subsequent iterations of the speed profile. By iterating, the decoupled planning problem/lateral problem may converge upon the optimal coupled solution.

The system may linearize 508 one or more of the lateral components about the reference path. The longitudinal components may not be linearized as a function of the reference path. Rather, they may be globally linear. The system may generate 510 a speed profile and a path that deviates from the reference path based on one or more of the linearized lateral components and/or one or more of the longitudinal components.

The system may generate 512 a new reference path for an autonomous vehicle. The system may generate a new reference path by fusing one or more lateral components and/or longitudinal components to create a fused solution. The system may map the fused solution from a curvilinear coordinate frame back to a Cartesian coordinate frame.

A longitudinal optimization problem may be solved to determine a speed profile. The speed profile along the reference path may provide curvature and speed as a function of time. This curvature and speed profile may be sampled at time points of interest, and may form the equilibrium point for lateral linearization. The lateral optimization problem may be constructed (utilizing the newly generated speed profile) and solved, which may generate an updated path.

A curvilinear coordinate frame may be defined with respect to a reference curve. Objects may be represented in a curvilinear frame by the lateral distance to the object as a function of longitudinal distance along the reference curve. For moving objects, the lateral distance may also be a function of time. As such, the system may consider the configuration space of an autonomous vehicle in curvilinear coordinates. For example, at each longitudinal location along a reference curve (and time), what is the lateral offset at which a representation of the autonomous vehicle (e.g., its rectangular footprint) will contact the object? This lateral offset is referred to in this disclosure as a margin.

Figure 6A:
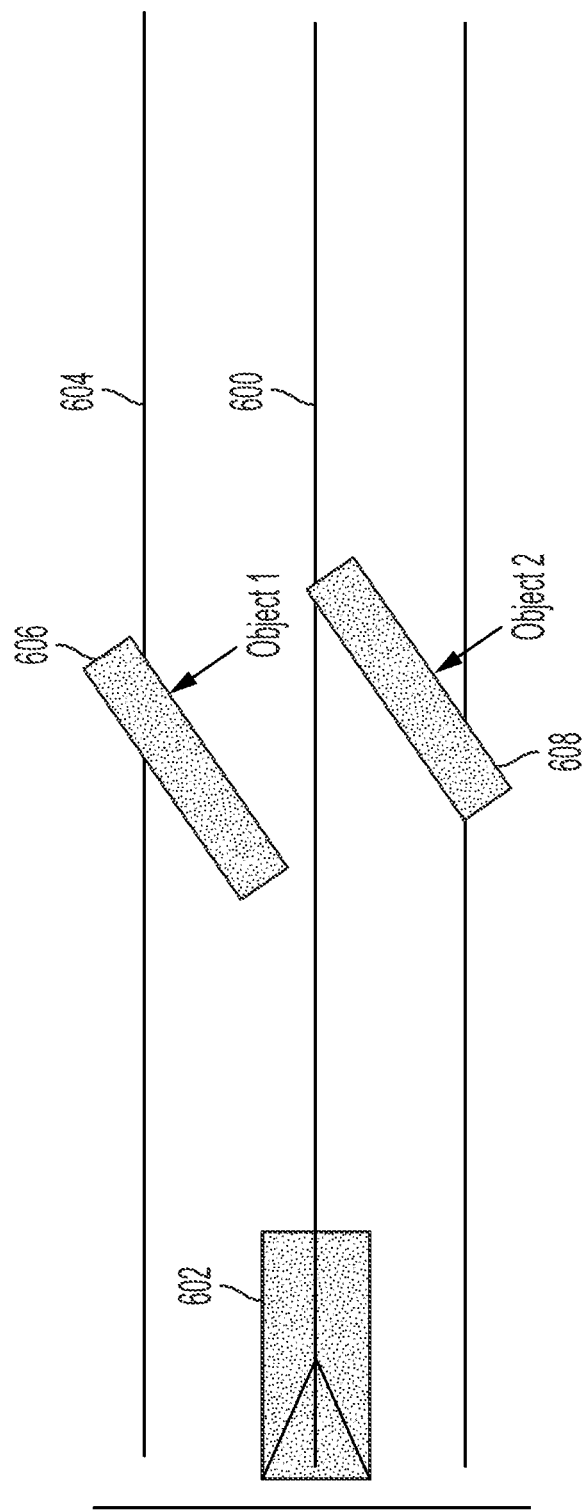
FIG. 6A illustrates an example original reference curve for an autonomous vehicle.

FIG. 6A illustrates an example original reference curve for an autonomous vehicle according to an embodiment. As shown in FIG. 6A, the reference curve 600 for an autonomous vehicle 602 is aligned with a lane 604 in which there are two objects, Object 1 606 and Object 2 608.

Figure 6B:
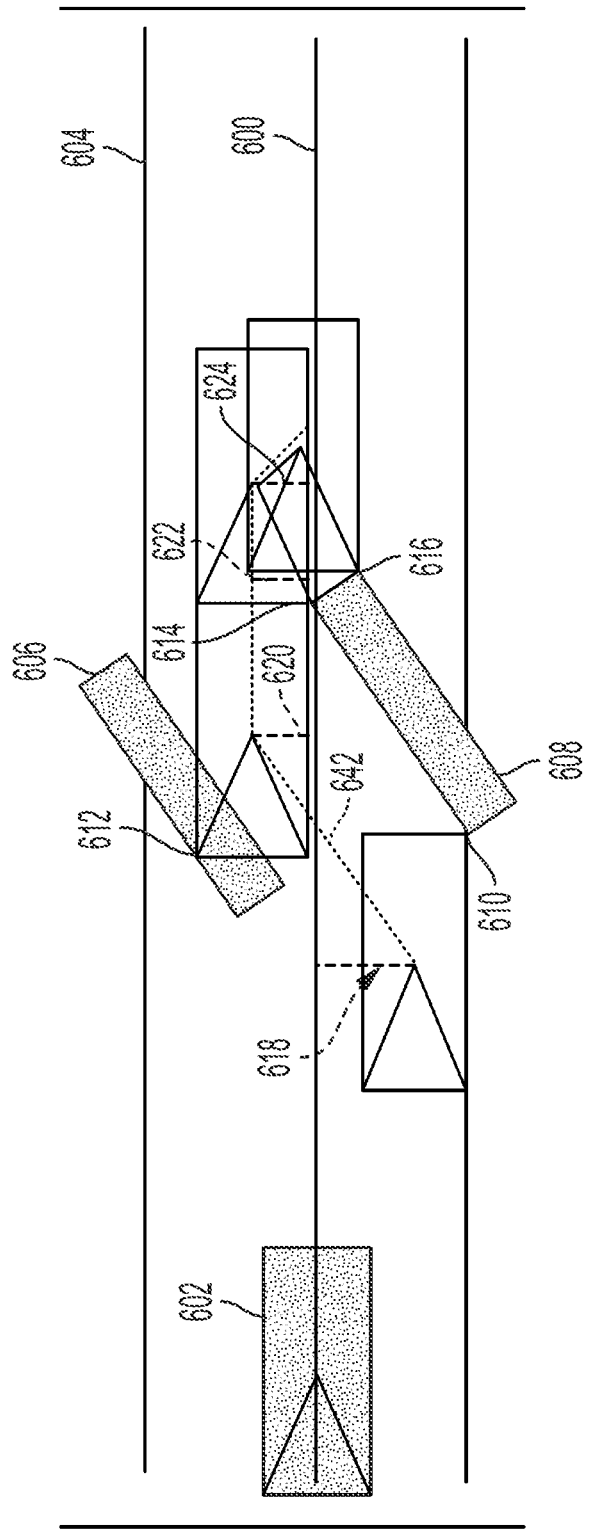
FIGS. 6B and 6C each illustrate an example visual depiction of margins to an object with respect to a reference curve.

FIG. 6B illustrates an example visual depiction of the margins to Object 2 608 with respect to the reference curve 600 according to an embodiment. As illustrated in FIG. 6B, at sample points (610, 612, 614, 616) along the reference curve 600, the autonomous vehicle's footprint 602 is slid laterally from the reference curve until it contacts Object 2 608, resulting in margins 618, 620, 622, 624). Reference 642 illustrates an example path of the autonomous vehicle across the sample points according to an embodiment.

Figure 6C:
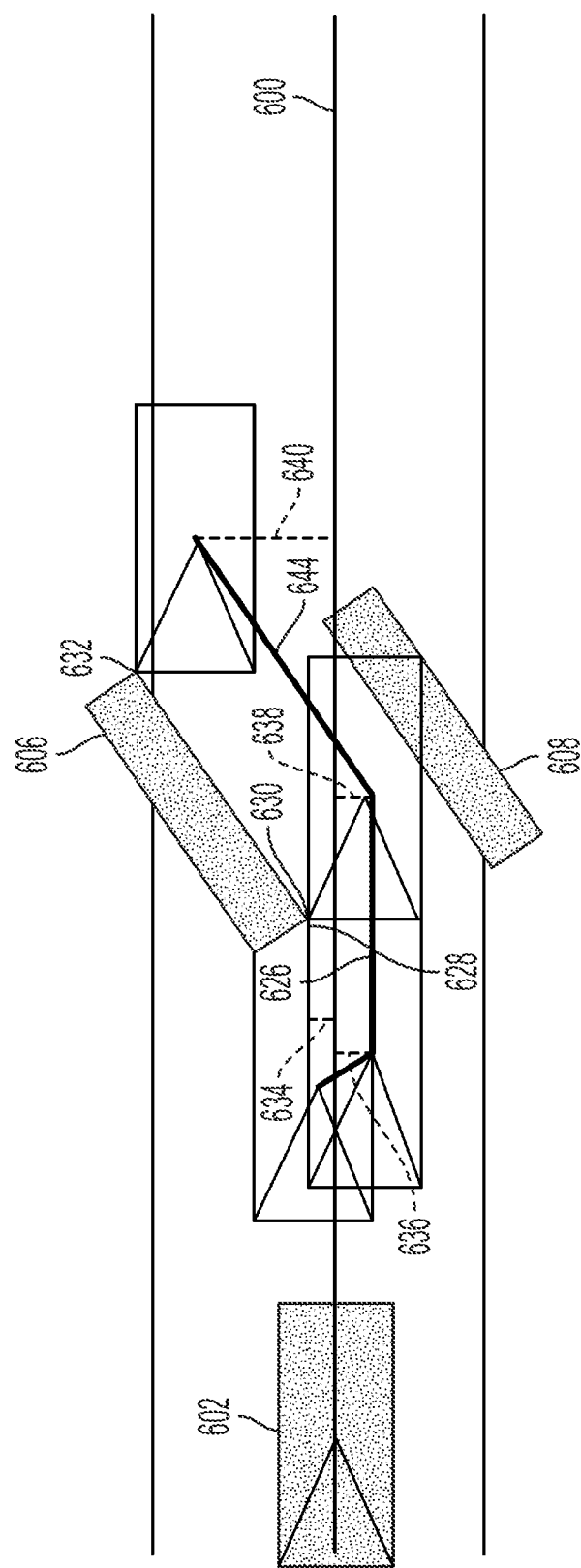

FIG. 6C illustrates an example visual depiction of the margins to Object 1 606 with respect to the reference curve 600 according to an embodiment. As illustrated in FIG. 6C, at sample points (626, 628, 630, 632) along the reference curve, the autonomous vehicle's footprint 602 is slid laterally from the reference curve until it contacts Object 1 606, resulting in margins 634, 636, 638, 640). Reference 644 illustrates an example path of the autonomous vehicle across the sample points according to an embodiment.

FIG. 6D illustrates an example left bound 646 and right bound 648 on the lateral offset based on the margins to Object 1 606 and Object 2 608, with respect to the lane-aligned reference curve 600 according to embodiment. In traditional planning in curvilinear space, the reference curve is lane aligned. For example, the reference curve approximately follows the lane centerline and is oriented in the direction of travel, as illustrated in FIGS. 6A-6D. However, the calculations of margins with respect to a lane-aligned reference curve can make the lane appear blocked when in fact it isn't.

For example, referring back to FIG. 6D, the left bound 646 based on margins to Object 1 606 and the right bound 648 based on margins to Object 2 overlap, suggesting that both bounds cannot be satisfied. However, there is a feasible path through the obstacles, which is apparent with a more appropriate reference curve, as illustrated in FIGS. 7A, 7B, and 7C.

Figure 7A:
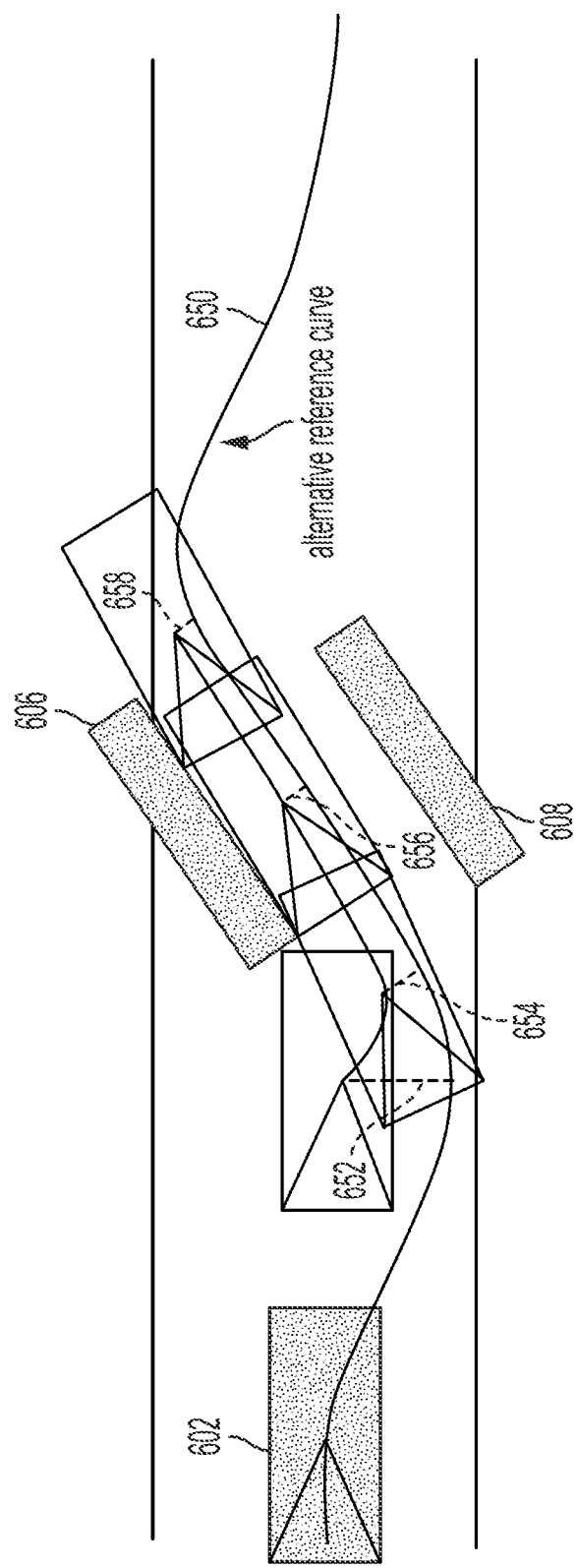
FIGS. 7A and 7B each illustrate an example visual depiction of margins to an object with respect to a reference curve.
Figure 7B:
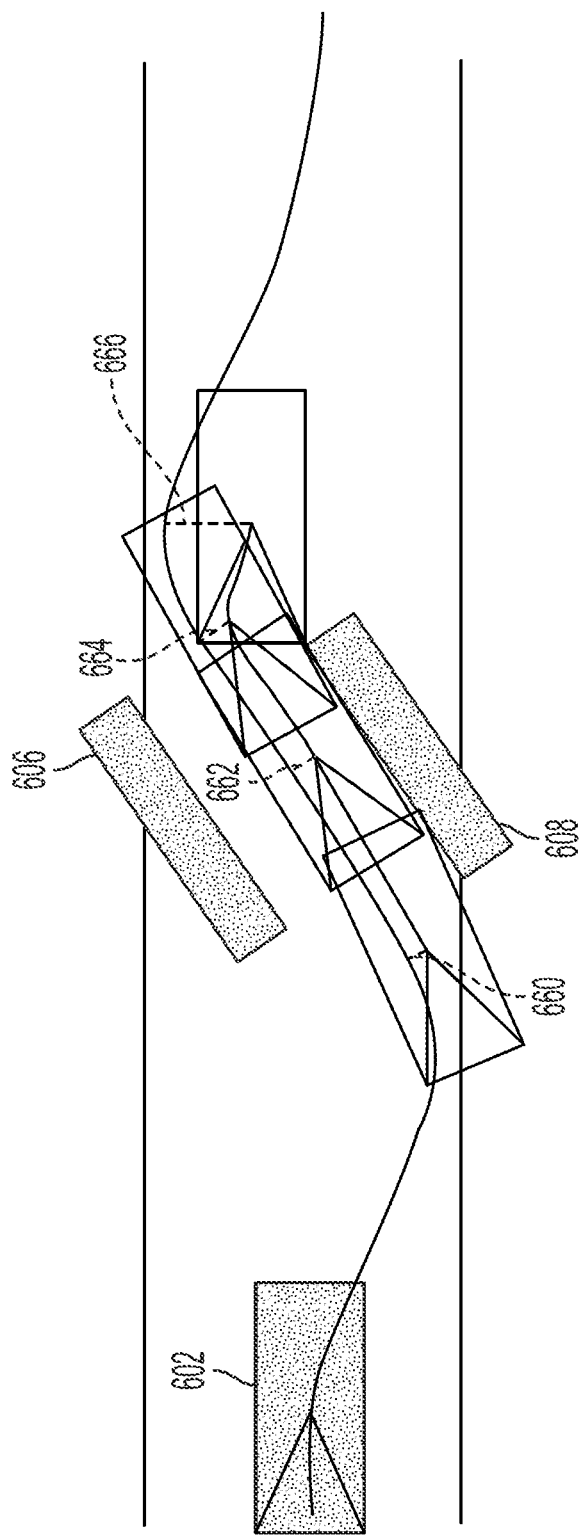
Figure 7C:
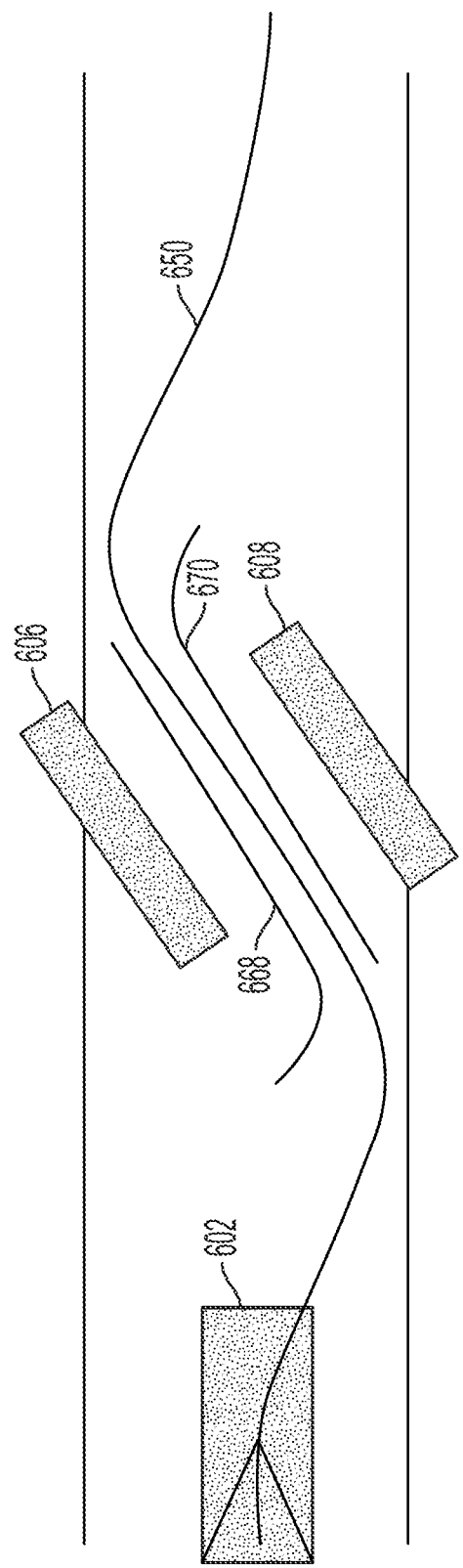
FIG. 7C illustrates example bounds on a lateral offset.

FIG. 7A illustrates example margins (652, 654, 656, 658) to Object 1 606 from alternative reference curve 650 according to an embodiment. FIG. 7B illustrates example margins (660, 662, 664, 666) to Object 2 608 from alternative reference curve 650 according to an embodiment. FIG. 7C illustrates example left and right bounds 668, 670 on margins to Object 1 606 and Object 2 608 with respect to the alternative reference curve 650 according to an embodiment.

Figure 8:
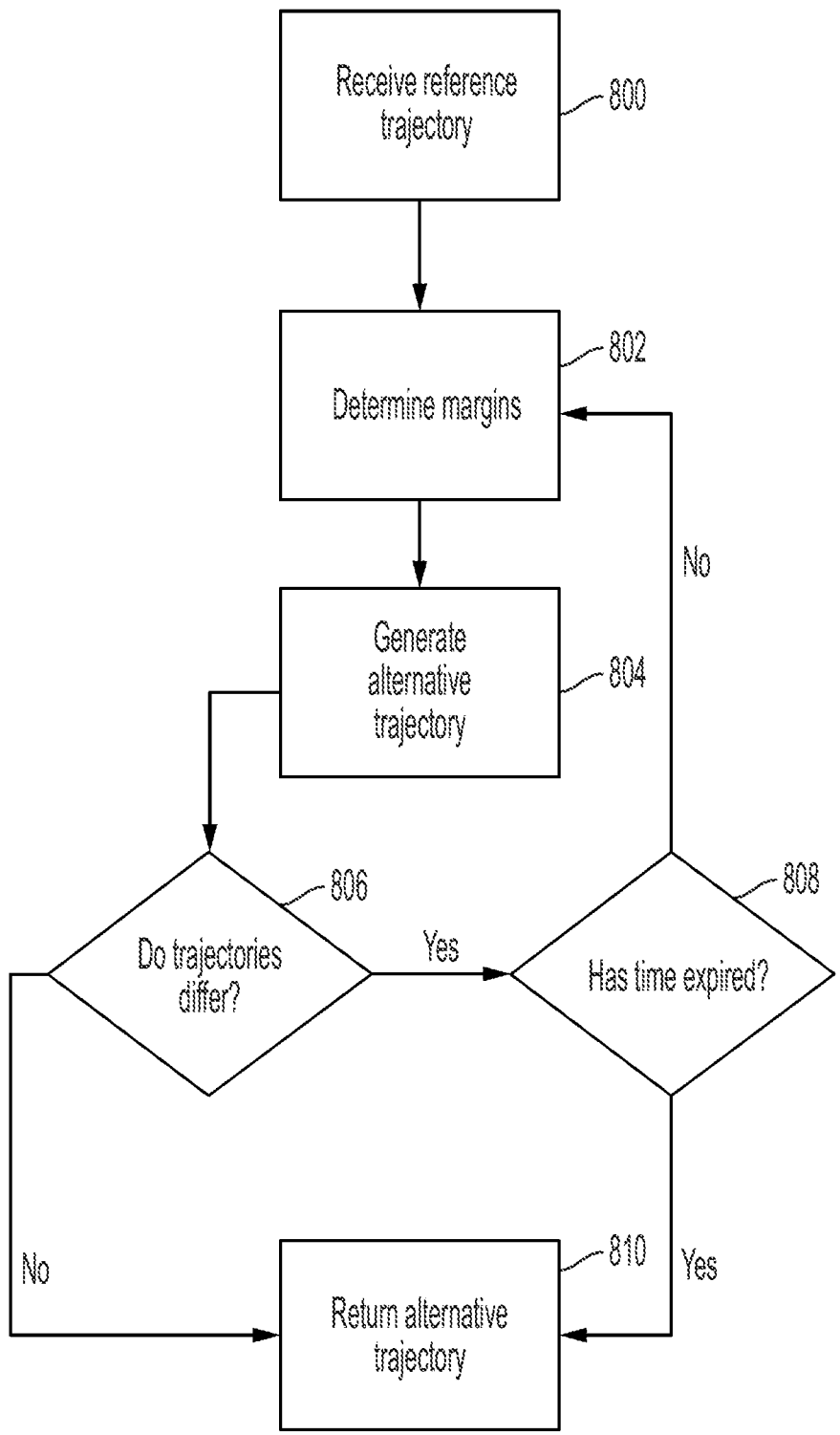
FIG. 8 illustrates an example method of generating an alternative reference curve.

FIG. 8 illustrates an example method of generating an alternative reference curve according to an embodiment. An alternative reference curve may be generated by iteratively improving an initial reference curve, and using the improved reference curve to update the margin and bound determinations. The alternative reference curve may be considered a trajectory because it contains a temporal component which may be used to compute margins to objects.

As illustrated by FIG. 8, the system may receive 800 a reference trajectory. The received reference trajectory does not need to account for obstacles in any way. The system may determine 802 one or more margins from the received reference trajectory and one or more obstacles along the trajectory. The system may use one or more of the determined margins to generate 804 an alternative trajectory. The system may compare the alternative trajectory to a previous version of the trajectory (e.g., the received reference trajectory or a previously determined alternative trajectory) to determine 806 whether they differ substantially. The system may determine 808 whether an applicable time period has expired. For example, the time period may be an amount of time allocated to the planning stage.

If the trajectories differ substantially and the applicable time period has not expired, the system may repeat steps 802-808. If the trajectories do not differ substantially or the applicable time period has expired, the system may return the current alternative trajectory.

In various embodiments, a trajectory may stabilize when a convergence measure is achieved or satisfied. For instance, when the generated trajectory is no longer substantially changing from iteration to iteration.

In various embodiments, the newly generated trajectory may be projected onto the trajectory of the previous iteration to generate a sequence of lateral discrepancy measures. In this situation, the convergence measure may be the root mean squared lateral discrepancy of the measures is less than a certain threshold and/or the maximum absolute discrepancy of the measures is less than a certain threshold. Additional and/or alternate convergence measures may be used within the scope of this disclosure.

As another example, a trajectory may stabilize when a time period associated with a planning stage expires, at which point, the current version of the alternative trajectory may be used.

In various embodiments, the alternative trajectory may be provided to a motion planning subsystem, a path follower subsystem, and/or another system or subsystem. Such systems may cause an autonomous vehicle (or a simulated autonomous vehicle) to implement the alternative trajectory by adjusting one or more operational parameters of the autonomous vehicle based on the alternative trajectory. The one or more operational parameters may pertain to velocity, speed, steering, and/or the like. For instance, an alternative trajectory may indicate that the steering direction should be adjusted right by 20 degrees, and that the velocity should be reduced by at least 10 miles per hour. An electronic device, such as, for example, an on-board computing device, may cause an autonomous vehicle to steer 20 degrees to the right and reduce its speed by at least 10 miles per hour. As another example, a simulation system may utilize an alternative trajectory to adjust one or more operational parameters of a simulated autonomous vehicle.

The accuracy of the alternative trajectory (e.g., how well the alternative trajectory reflects where an autonomous vehicle will actually travel) will improve with each iteration. Once the new reference path has stabilized, the result is a path planning formulation that is capable of generating trajectories that may deviate significantly from a proposed reference path without incurring significant error. Since a solution is available each time the system completes the process described in FIG. 5, the routine can be deployed for anytime planning, and the solution can continue to be refined throughout the path planning execution cycle. As such, a new reference path may deviate from a reference path with small error, which may provide a substantial advantage for autonomous vehicles when operating in certain environments or situations (e.g., in dense, urban environments).

Figure 9:
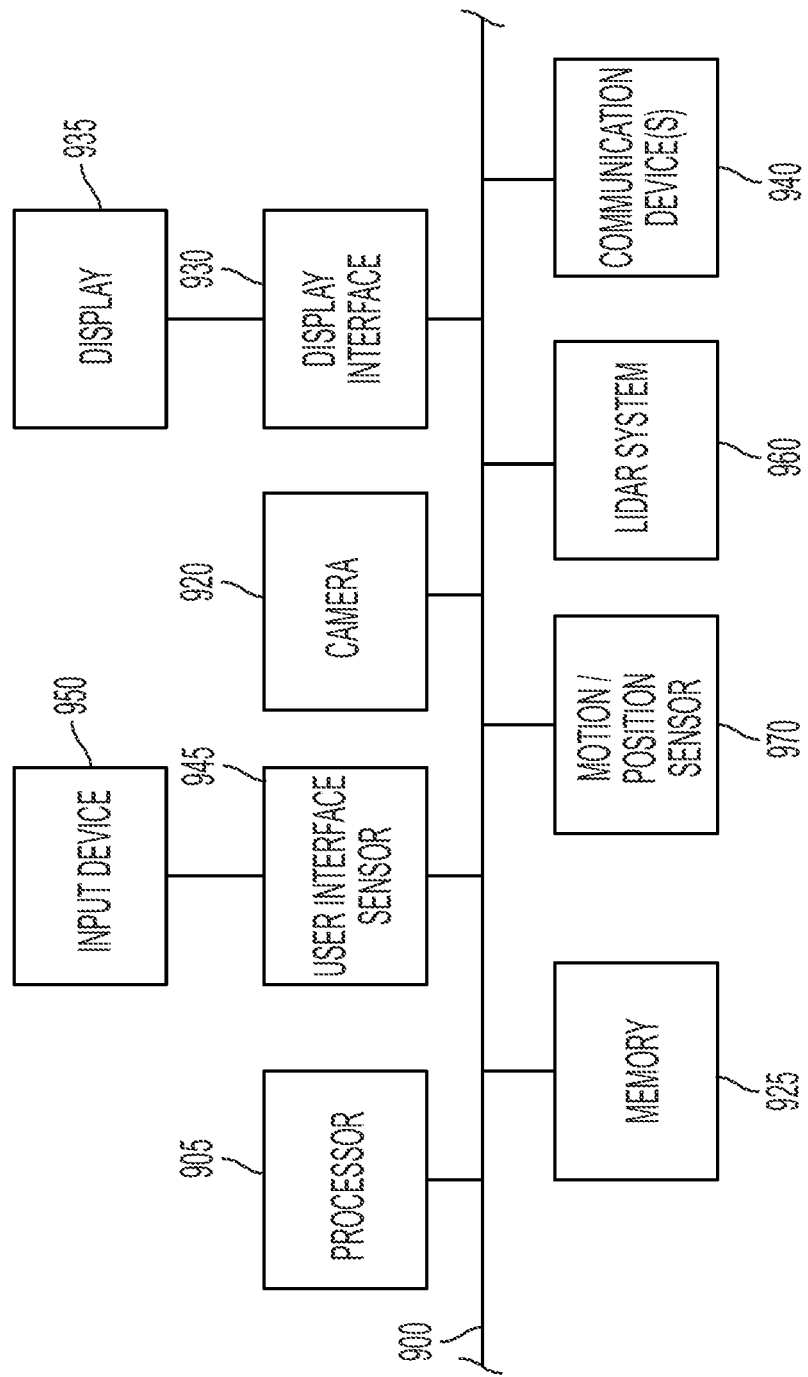
FIG. 9 is a block diagram that illustrates various elements of a possible electronic subsystem of an AV and/or external electronic device.

FIG. 9 depicts an example of internal hardware that may be included in any of the electronic components of the system, such as internal processing systems of the AV, external monitoring and reporting systems, or remote servers. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 925. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 930 may permit information from the bus 900 to be displayed on a display device 935 in visual, graphic or alphanumeric format, such on an in-dashboard display system of the vehicle. An audio interface and audio output (such as a speaker) also may be provided. Communication with external devices may occur using various communication devices 940 such as a wireless antenna, a radio frequency identification (RFID) tag and/or short-range or near-field communication transceiver, each of which may optionally communicatively connect with other components of the device via one or more communication system. The communication device(s) 940 may be configured to be communicatively connected to a communications network, such as the Internet, a local area network or a cellular telephone data network.

The hardware may also include a user interface sensor 945 that allows for receipt of data from input devices 950 such as a keyboard or keypad, a joystick, a touchscreen, a touch pad, a remote control, a pointing device and/or microphone. Digital image frames also may be received from a camera 920 that can capture video and/or still images. The system also may receive data from a motion and/or position sensor 970 such as an accelerometer, gyroscope or inertial measurement unit. The system also may receive data from a LiDAR system 960 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

In this document, the terms "street," "lane" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" may represent an airway and a lane may be a portion of the airway. If the autonomous vehicle is a watercraft, then the term "street" may represent a waterway and a lane may be a portion of the waterway.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

An "automated device monitoring system" is a set of hardware that is communicatively and/or electrically connected to various components (such as sensors) of an automated device to collect status or operational parameter values from those components. An automated device monitoring system may include or be connected to a data logging device that includes a data input (such as a wireless receiver) that is configured to receive device operation data directly or indirectly from the device's components. The monitoring system also may include a processor, a transmitter and a memory with programming instructions. A monitoring system may include a transmitter for transmitting commands and/or data to external electronic devices and/or remote servers. In various embodiments, a monitoring system may be embedded or integral with the automated device's other computing system components, or it may be a separate device that is in communication with one or more other local systems, such as, for example in the context of an autonomous vehicle, an on-board diagnostics system.

In this document, when relative terms of order such as "first" and "second" are used to modify a noun, such use is simply intended to distinguish one item from another, and is not intended to require a sequential order unless specifically stated.

A "reference path" refers to a trajectory of an autonomous vehicle. A reference path may be determined by a motion planning subsystem of an autonomous vehicle.

An "objective" refers to a criterion that factors into path planning decision making for an autonomous vehicle. Example objectives may include, without limitation, traffic rules, travel within defined road boundaries, collision avoidance, comfortable passing or overtaking, maintaining safe distances, and/or the like.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A method for generating a trajectory for an autonomous vehicle, comprising:
    performing, by a computing device, a process comprising:
        projecting an objective identified by a reference trajectory from a Cartesian reference frame to a curvilinear coordinate frame as a constraint indicating where the autonomous vehicle should be laterally in order to satisfy the objective;
        generating an alternative trajectory having a refined lateral path for the autonomous vehicle based on the objective projected in the curvilinear coordinate; and mapping the alternative trajectory having the refined lateral path from the curvilinear coordinate frame to the Cartesian reference frame;
comparing, by the computing device, the first alternative trajectory to the reference trajectory or a previously generated alternative trajectory to obtain at least one discrepancy measure;
selecting, by the computing device, whether to repeat the process based on the at least one discrepancy measure; and
repeating, by the computing device, the process using the alternative trajectory, in response to said selecting.

2. The method according to claim 1, wherein said generating the alternative trajectory comprises decoupling a lateral component of the objective and a longitudinal component of the objective.

3. The method according to claim 2, wherein said generating the alternative trajectory further comprises linearizing the lateral component about the reference trajectory to obtain a lateral problem.

4. The method according to claim 3, wherein said generating the alternative trajectory further comprises solving the lateral problem to obtain a linearized lateral component of the objective.

5. The method according to claim 4, wherein said generating the alternative trajectory comprises fusing the linearized lateral component with a longitudinal component of the objective to create a fused solution, as the refined lateral path.

6. The method according to claim 1, wherein said comparing comprises projecting the alternative trajectory onto the reference trajectory or the previously generated alternative trajectory to obtain a convergence measure.

7. The method according to claim 6, wherein the convergence measure is a function of a sequence of lateral discrepancy measures, as the discrepancy measure.

8. The method according to claim 1, wherein the reference trajectory and, the alternative trajectory are different from each other.

9. A system, comprising:
a processor;
a non-transitory computer-readable storage medium comprising programming instructions that are configured to cause the processor to implement a method for generating a trajectory for an autonomous vehicle, wherein the programming instructions comprise instructions to:
perform a process comprising:
project an objective identified by a reference trajectory from a Cartesian reference frame to a curvilinear coordinate frame as a constraint indicating where the autonomous vehicle should be laterally in order to satisfy the objective;
generate an alternative trajectory having a refined lateral path for the autonomous vehicle based on the objective projected in the curvilinear coordinate; and
map the alternative trajectory having the refined lateral path from the curvilinear coordinate frame to the Cartesian reference frame;
compare the alternative trajectory to the reference trajectory or a previously generated alternative trajectory to obtain at least one discrepancy measure;
select whether to repeat the process based on the at least one discrepancy measure; and
repeat the process using the alternative trajectory, the second alternative trajectory for the autonomous vehicle in response to said selecting.

10. The system according to claim 9, wherein the alternative trajectory is generated by further decoupling a lateral component of the objective and a longitudinal component of the objective.

11. The system according to claim 10, wherein the alternative trajectory is generated by further linearizing the lateral component about the reference trajectory to obtain a lateral problem.

12. The system according to claim 11, wherein the alternative trajectory is generated by further solving the lateral problem to obtain a linearized lateral component of the objective.

13. The system according to claim 12, wherein the alternative trajectory is generated by further fusing the linearized lateral component with a longitudinal component of the objective to create a fused solution.

14. The system according to claim 9, wherein the alternative trajectory is compared to the reference trajectory or a previously generated alternative trajectory by projecting the alternative trajectory onto the reference trajectory or the previously generated alternative trajectory to obtain a convergence measure.

15. The system according to claim 14, wherein the convergence measure is a function of a sequence of lateral discrepancy measures, as the discrepancy measure.

16. A non-transitory computer-readable medium that stores instructions that are configured to, when executed by at least one computing device, cause the at least one computing device to perform operations comprising:
performing, by a computing device, a process comprising:
projecting an objective identified by a reference trajectory of an autonomous vehicle from a Cartesian reference frame to a curvilinear coordinate frame as a constraint indicating where the autonomous vehicle should be laterally in order to satisfy the objective;
generating an alternative trajectory having a refined lateral path for the autonomous vehicle based on an objective identified by the reference trajectory; and
mapping the alternative trajectory having the refined lateral path from the curvilinear coordinate frame to the Cartesian reference frame;
comparing the alternative trajectory to the reference trajectory or a previously generated alternative trajectory to obtain at least one discrepancy measure;
selecting whether to repeat the process based on the at least one discrepancy measure; and
repeating the process in response to said selecting.

* * * * *